June 13, 1961 B. F. SKINNER 2,987,828
TEACHING AND TESTING AID
Filed Aug. 20, 1957 9 Sheets-Sheet 1

Inventor:
Burrhus F. Skinner,
by Arthur D Thomson
Attorney

June 13, 1961        B. F. SKINNER        2,987,828
TEACHING AND TESTING AID
Filed Aug. 20, 1957        9 Sheets-Sheet 2
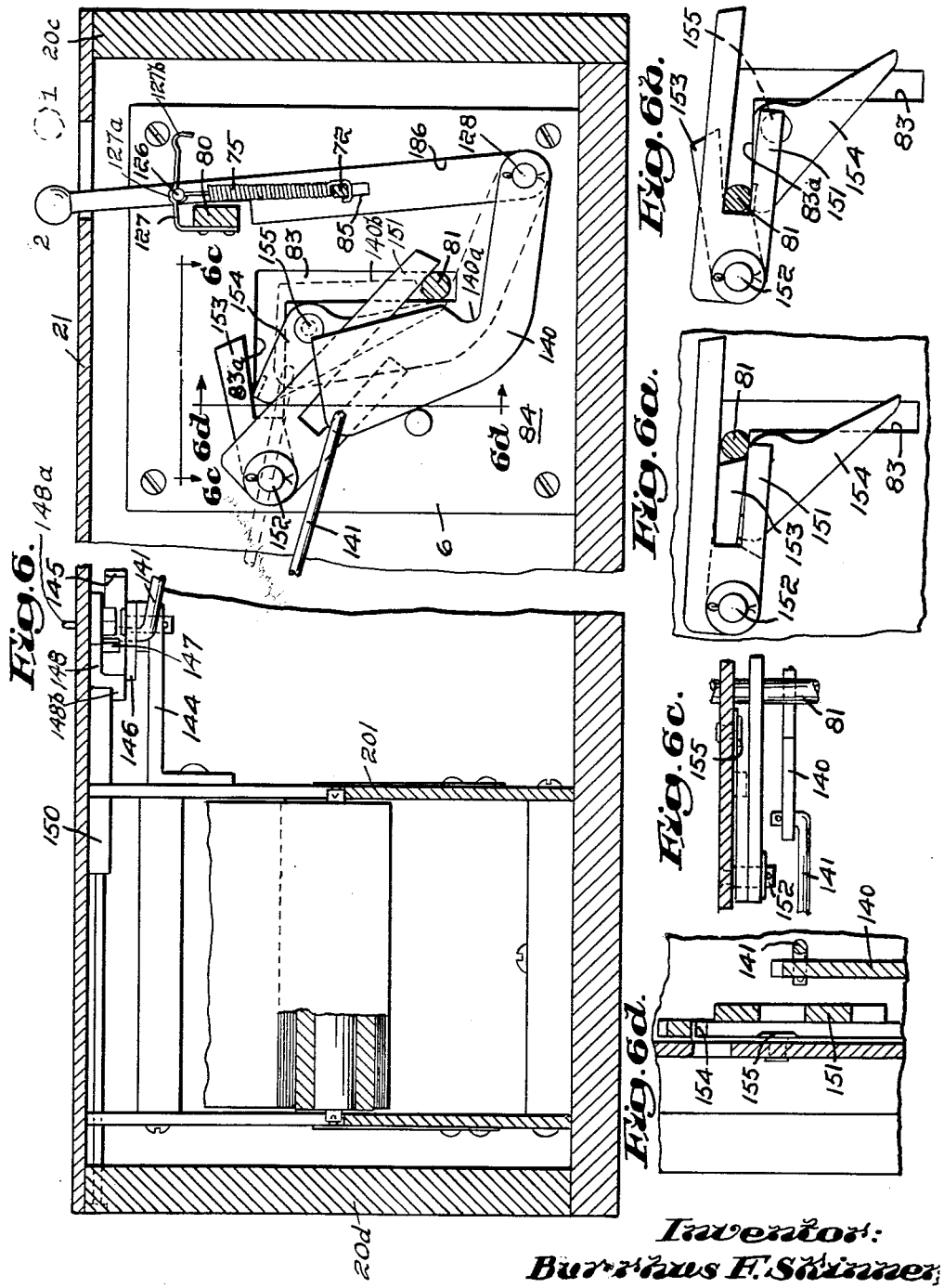
Inventor:
Burrhus F. Skinner
by Arthur D Thomson
Attorney

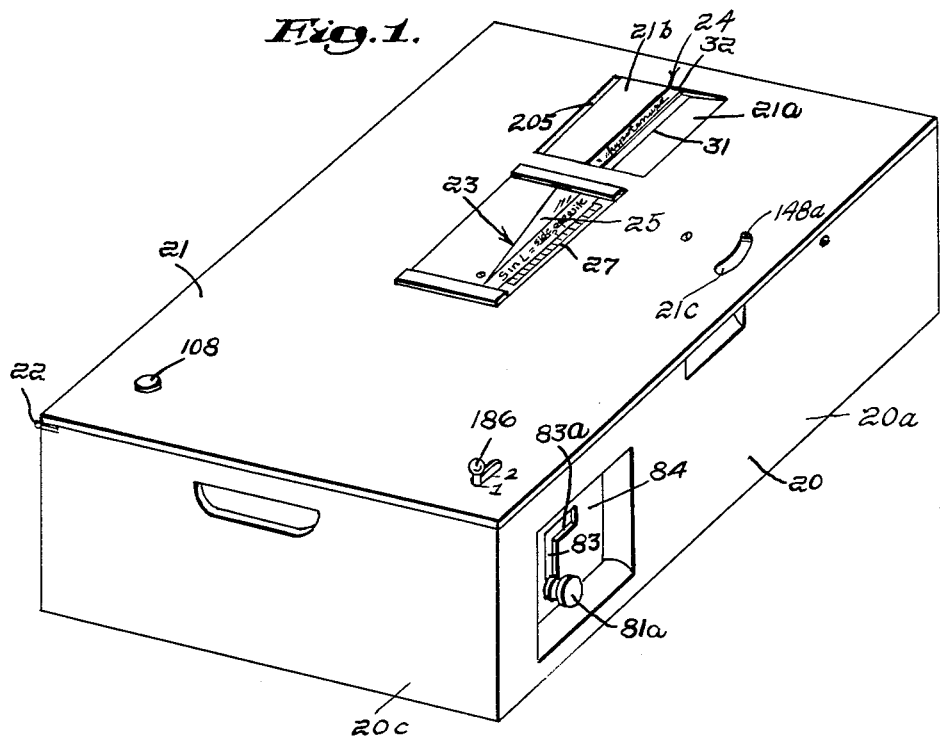
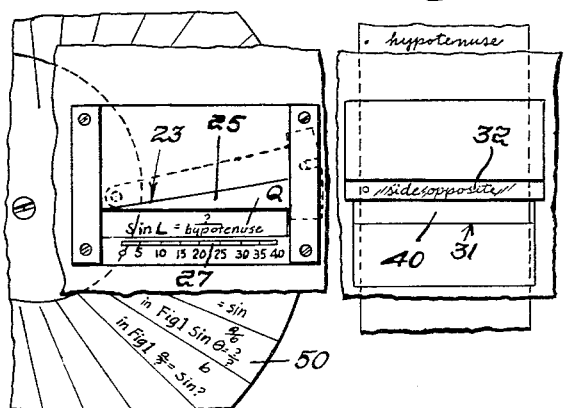
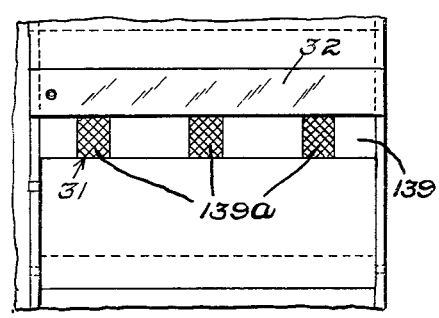
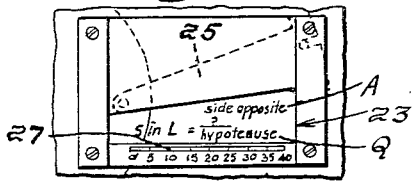

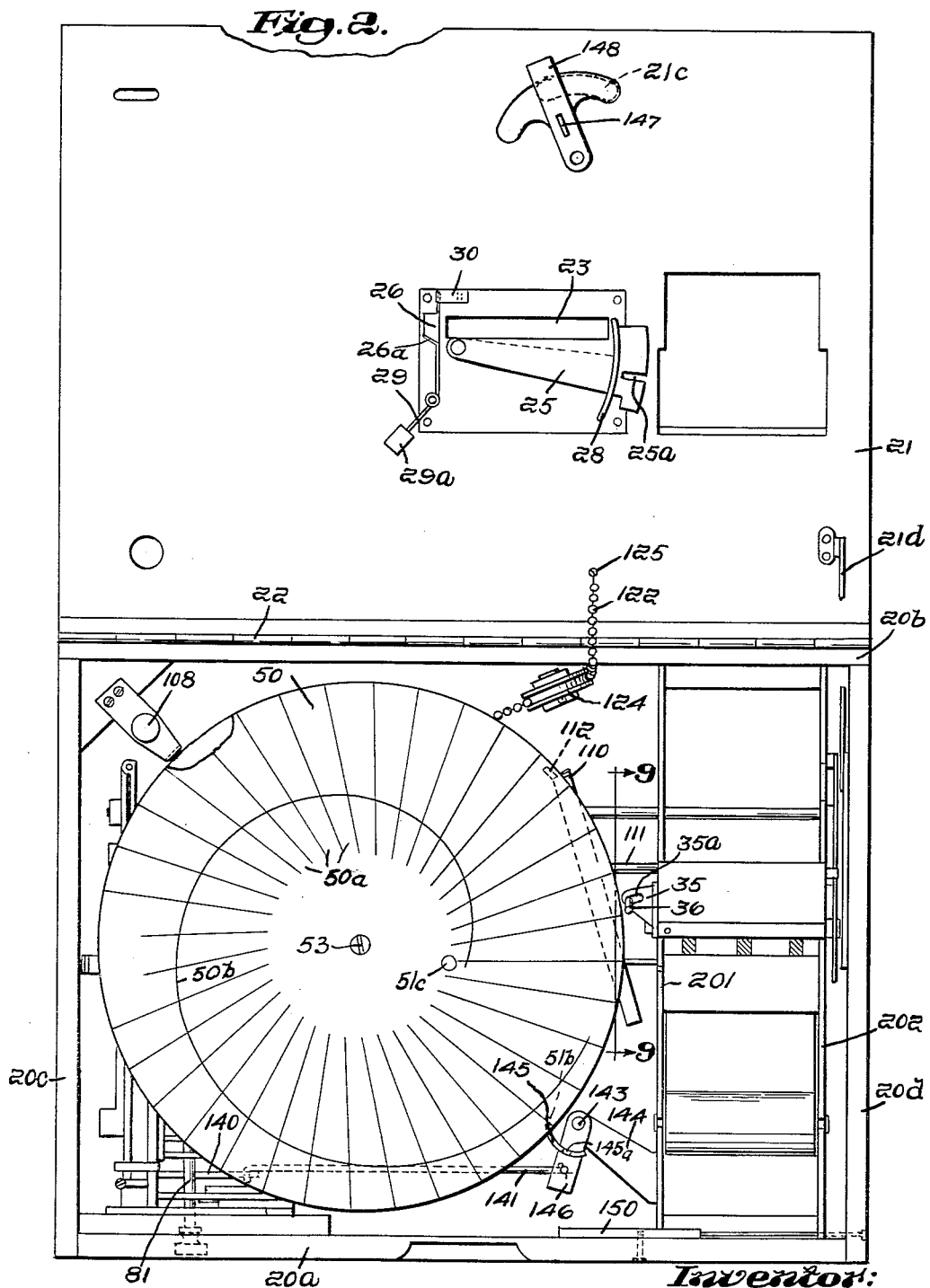

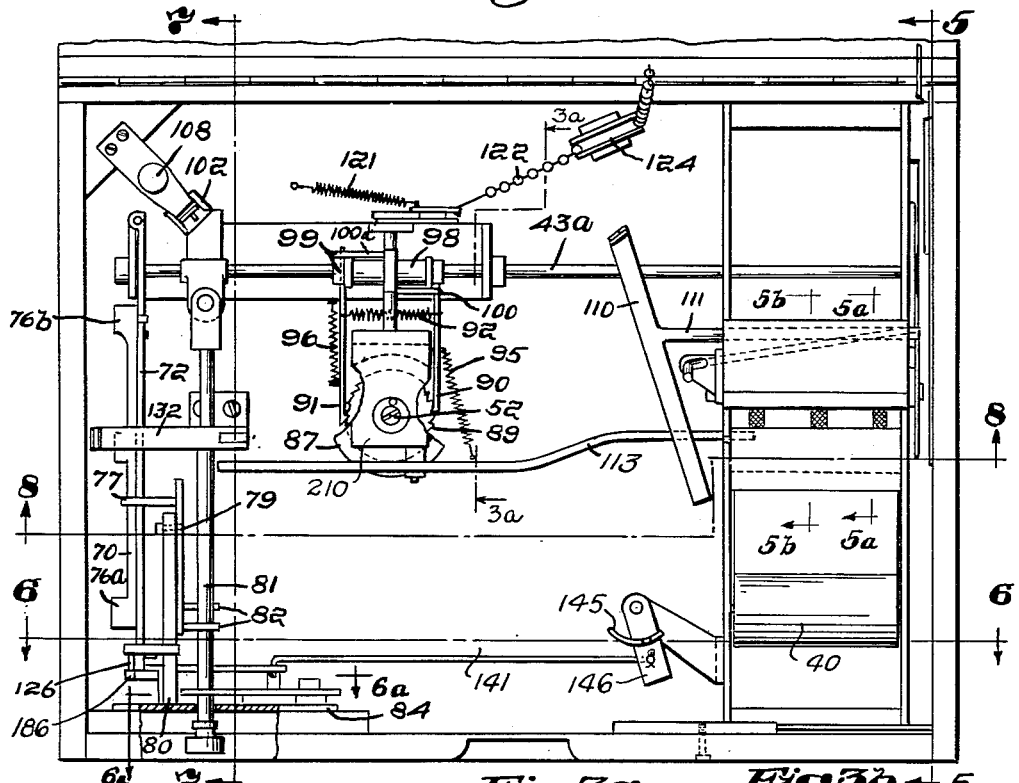
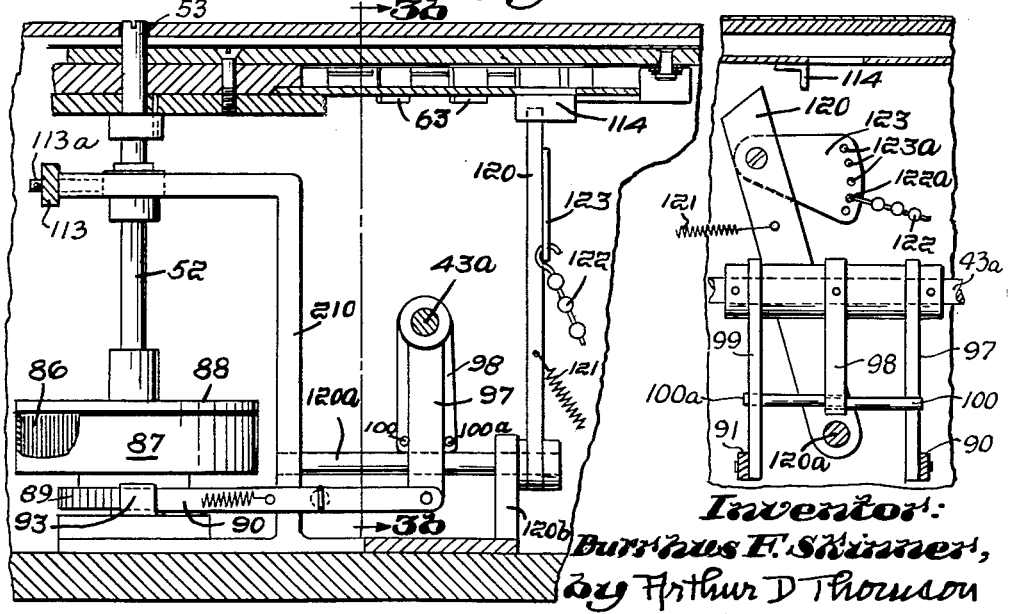

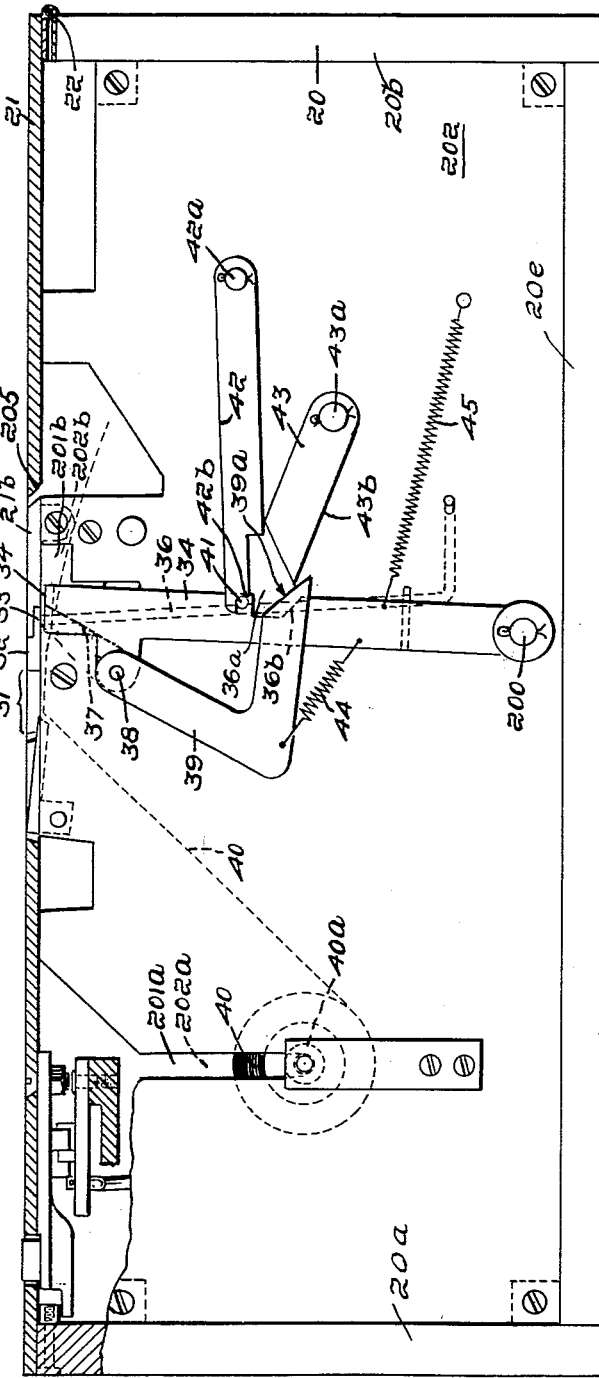

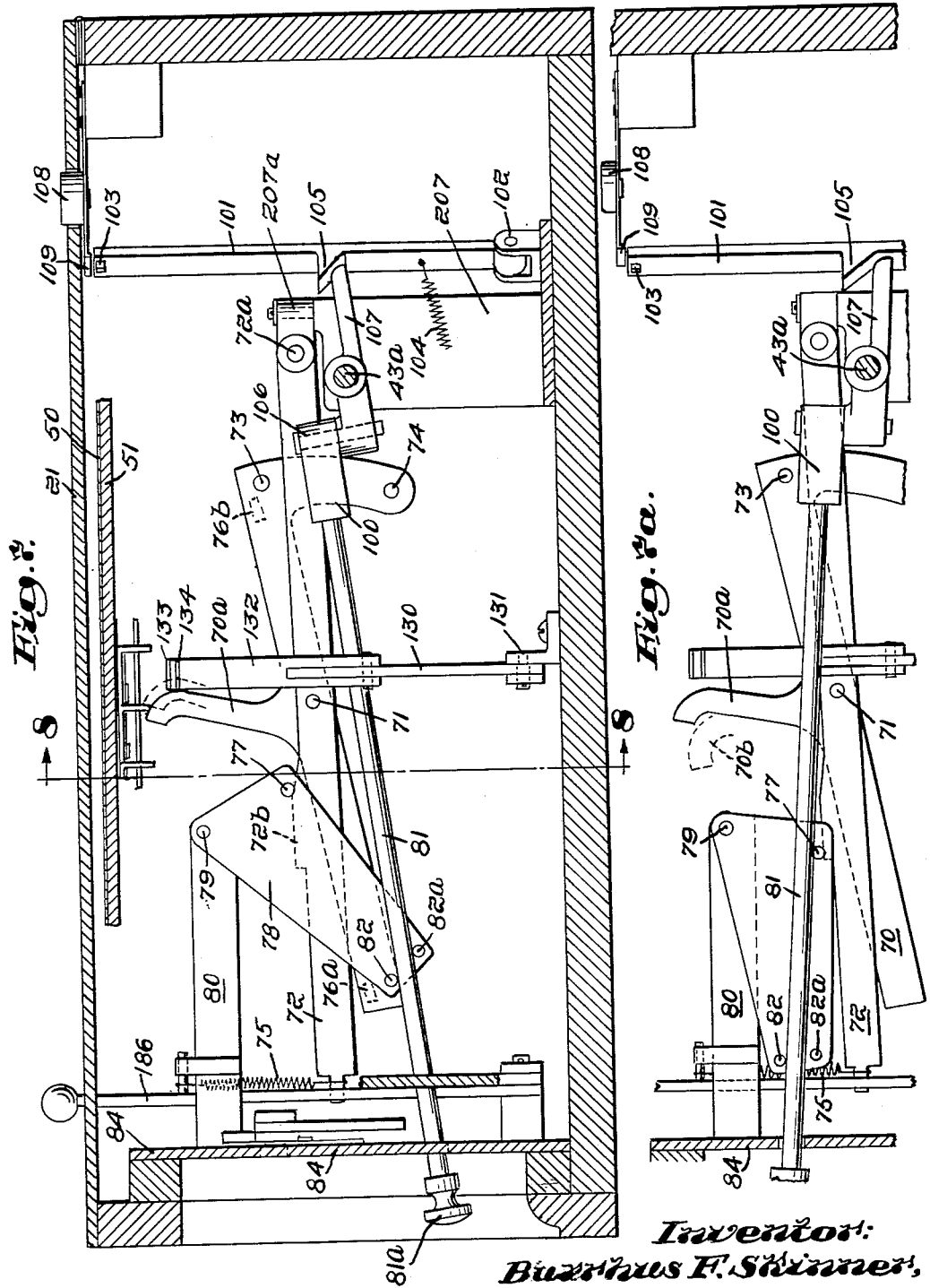

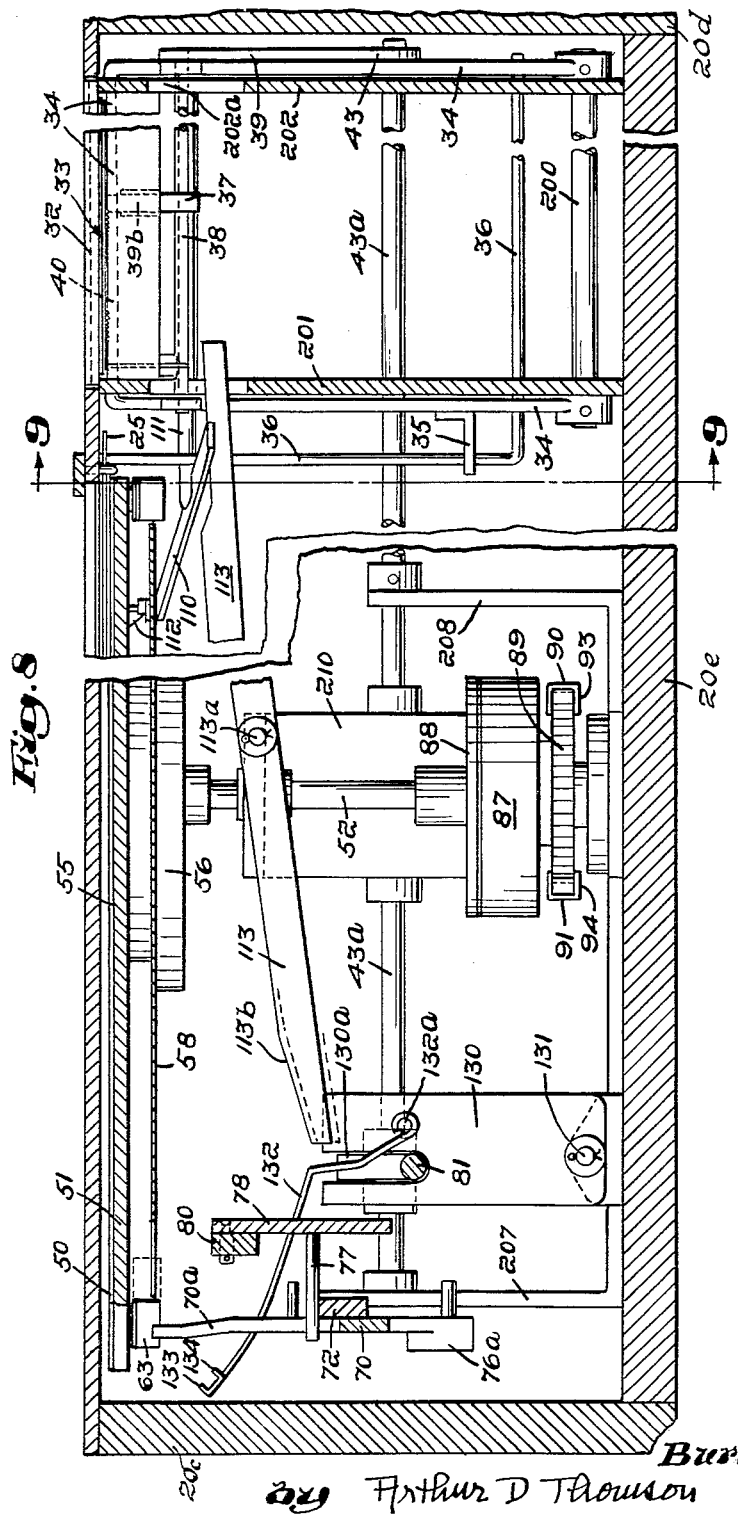

June 13, 1961  B. F. SKINNER  2,987,828
TEACHING AND TESTING AID
Filed Aug. 20, 1957  9 Sheets-Sheet 9

United States Patent Office 2,987,828
Patented June 13, 1961

2,987,828
TEACHING AND TESTING AID
Burrhus F. Skinner, Cambridge, Mass., assignor to Rheem Manufacturing Company, New York, N.Y., a corporation of California
Filed Aug. 20, 1957, Ser. No. 679,182
4 Claims. (Cl. 35—9)

This invention relates to teaching aids, and more particularly to mechanical devices of the general type which present an ordered succession of questions, problems, or instructions to a student and give him an immediate indication as to whether his response in each instance is correct or incorrect.

There are several kinds of mechanical and semi-mechanical devices presently in use for aiding students in reviewing or for testing. Most of these devices employ the "multiple choice" principle, that is, the student is presented with a question and several answers, from which he selects the answer which he thinks is correct. In a typical mechanical reviewing aid, a number of cards bearing questions and answers are presented in succession, and the student indicates his choice by pressing a selected knob or lever, which operates an indicator. Such machines may also have counting devices for indicating the student's score of correct answers. In general, these devices are intended merely to aid the student in testing himself and do not yield a permanent record of his performance. For testing, multiple choice forms are often used. On such forms the student makes a permanent record by marking or punching the form, and the form can be used only once.

The multiple choice technique has certain disadvantages both for teaching and for testing. The student does not acquire the important behavior of composing the answer himself. He learns merely to recognize the correct answer. Also, he may, in many cases, arrive at the correct answer by guess-work.

One of the principal objects of this invention is to provide a mechanical teaching aid which requires the student to compose and write in his own answer to questions or problems, and which produces a permanent record of his performance, separate from, and hence leaving reuseable, the material presented to him. Another object is to provide a device which gives an accurate record of a student's performance not easily falsified and hence requiring a minimum of supervision by the teacher.

In this application the terms "question" and "answer" are used to refer, respectively, to the material presented to the student and his written response. It is to be understood that problems, instructions, suggestions, etc. can also be presented; although those are not strictly "questions" nor are the student's responses strictly "answers."

In the device here disclosed the questions are placed on segments of a disk which is mounted on a turntable. The machine has a housing with a window in which successive sectors are exposed. The correct answer to each question is printed on a portion of the sector and the machine has a movable mask which covers this portion until the student has put down his answer. An opening in the casing exposes a paper tape on which the student writes his answer. A lever and linkage arrangement permits him to withdraw the mask to expose the correct answer, while, at the same time, covering his own answer with a transparent window. He can then compare his answer with the correct one but cannot change his recorded answer.

In this embodiment of the invention an operating lever moves up and down and transversely. In the down position only the question is exposed. Upward movement of the lever causes the mask to be drawn back. The student is instructed to make a sideward movement if his answer is correct. The movement operates a punching mechanism which marks the tape alongside the answer which has been called correct.

Preferably the machine housing has an automatic locking arrangement so that the entire sequence of questions must be answered correctly once, or a specific number of times, before the housing can be opened. The machine also has provision for skipping questions which have already been answered correctly and repeating only those for which the student's first answer was incorrect. Other advantages and novel features of the invention will be apparent from the following description.

FIG. 1 is a perspective view of a teaching aid constructed according to the invention;

FIG. 1a is a fragmentary plan view of the device in the region of the question window;

FIG. 1b is a fragmentary plan view in the region of the answer window;

FIG. 1c is a view similar to FIG. 1a showing the correct answer exposed on the question disk;

FIG. 1d is an enlarged frammentary plan view of the answer window block supporting the tape partly exposed;

FIG. 2 is a plan view of the device with the cover of the case open;

FIG. 3 is a plan view of the device with the turntable removed;

FIG. 3a is an enlarged fragmentary cross-section taken along line 3a—3a of FIG. 3;

FIG. 3b is a fragmentary cross-section taken along line 3b—3b of FIG. 3a;

FIG. 5 is an enlarged cross-section taken along line 5—5 of FIG. 3;

FIG. 5a is an enlarged fragmentary cross-section taken along line 5a—5a of FIG. 3, showing the tape drive mechanism in a position to engage the tape;

FIG. 5b is an enlarged fragmentary cross-section taken aolng line 5b—5b of FIG. 3;

FIG. 5c is a section similar to FIG. 5b, showing the tape drive mechanism disengaged;

FIG. 6 is an enlarged cross-section, partly broken away, taken along line 6—6 of FIG. 3;

FIG. 6a is a fragmentary cross-section taken along line 6a—6a of FIG. 3, showing a locking device which, on occasion, prevents the operating lever from moving sidewise;

FIG. 6b is a view similar to FIG. 6a showing the latching device released;

FIG. 6c is a fragmentary cross-section along line 6c—6c of FIG. 6;

FIG. 6d is a fragmentary cross-section along line 6d—6d of FIG. 6;

FIG. 7 is an enlarged cross-section taken along 7—7 of FIG. 3;

FIG. 7a is a fragmentary plan view of the portion of the machine shown in FIG. 7;

FIG. 8 is an enlarged cross-section, partly broken away, taken along line 8—8 of FIG. 3.

Figure 4:
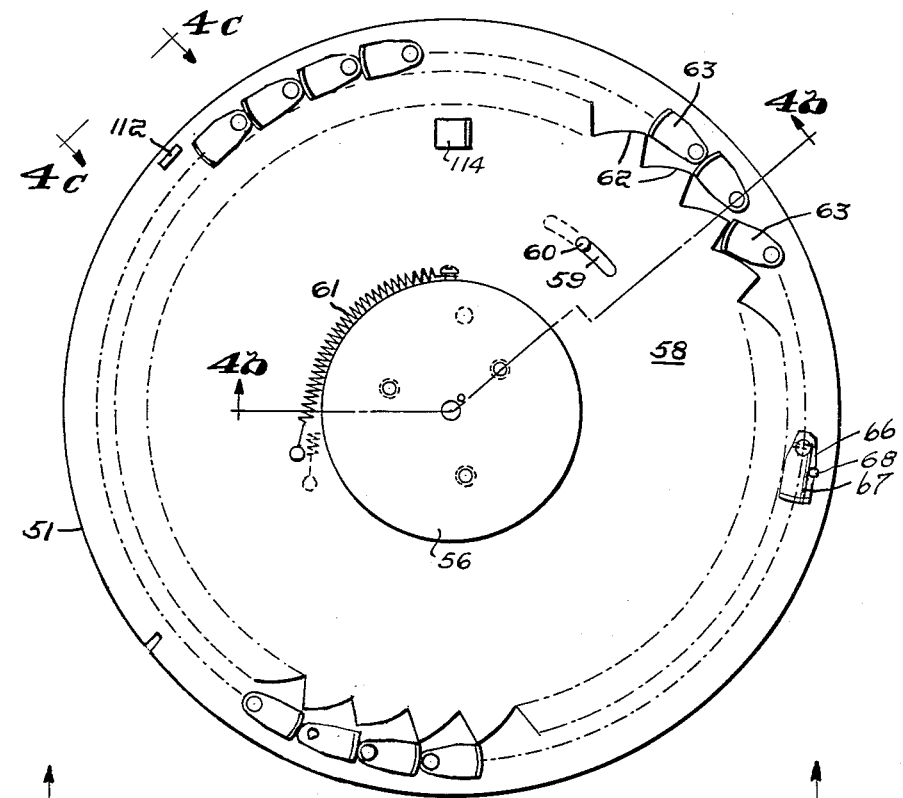
FIG. 4 is a bottom view of the turntable.
Figure 4A:
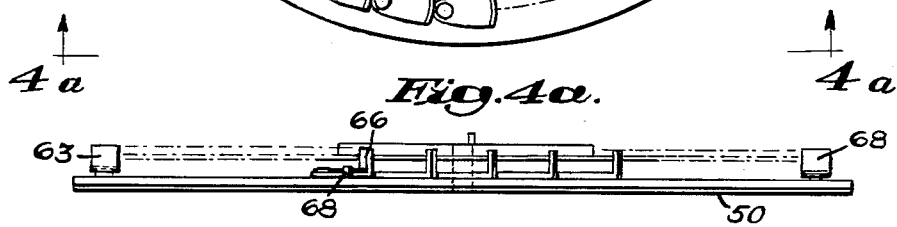
FIG. 4a is a view of the turntable taken along line 4a—4a of FIG. 4.

The various mechanisms of the machine are mounted in a rectangular case 20 having front and rear walls 20a and 20b, side walls 20c and 20d, and a bottom wall 20e. A cover 21 is attached to the wall 20b by means of a hinge 22. In the middle of the cover is a window 23 which is trapezoidal in shape to expose one of the sectors on the question disk. Toward the right is a second rectangular window 24 which exposes the tape on which the student writes his answers. A mask 25 is pivoted to the cover near window 23. As best seen in FIG. 2, this mask is slidable between the cover and a guide rod 28, and has a notch 25a which is engaged by a mechanism, to be later described, which advances and retracts the mask to cover and uncover the rear portion of window 23. In FIG. 1 and FIG. 1a the mask 25 is shown in advanced position, and in FIG. 1c in retracted position.

A second mask 26, seen in FIG. 2, is mounted on an arm 29 which is pivoted on the inside of the cover, the movement of the arm 29 being limited by the guide 30. This mask can be swung to cover or uncover the left-hand corner of window 23. Along the bottom of window 23, on the outside of the cover, is a scale 27. The opening 24 has an uncovered portion 31 which gives access to the tape 40 on which the student writes his answer, and a transparent window 32 supported on a plate 21b which partially blocks the opening. The cover has a sloping portion 21a leading to open portion 31. Disposed under opening 24 is a mask 33, best seen in FIGS. 5 through 5c, which reciprocates back and forth under window 32. The mask 33 is mounted on the upper part of an inverted channel-shaped yoke or bail 34 which is carried on a shaft 200 journalled in a pair of partition walls 201 and 202. Bail 34 carries a sidewardly projecting finger 35 (FIG. 8). This finger has a slot 35a, as shown in FIG. 2, to receive an arm 36 (FIGS. 8 and 9) which is journalled in walls 201 and 202 to swing about an axis at an angle to shaft 200. The upper end of arm 36 is engaged in slot 25a of mask 25. Bail 34 and arm 36 are operated together by a mechanism to be later described to advance and retract masks 33 and 25 respectively.

Between walls 201 and 202 is mounted the mechanism which drives the paper tape on which the student writes his answers. This mechanism is best illustrated in FIGS. 5 through 5c. The roll of paper tape 40, which may be standard adding machine tape wound on a cardboard core, is mounted on a shaft 40a which rests in slots 201a and 202a in walls 201 and 202. Immediately under window 24 is mounted a fixed block 139 carrying, on its upper face, several knurled inserts 139a. This block has a slot 139b through which projects a finger 37. This finger is secured to a shaft 38 which is journalled on the sides of bail 34. An arm 39 is secured to shaft 38 outside of wall 202, this wall having an opening 202b and wall 201 having a similar opening 201b which permit rocking movement of the bail along with the finger and arm. A coil spring 44, connected to arm 39 and bail 34, is biased to hold finger 37 into engagement with the cross portion of bail 34, as shown in FIG. 5b. A spring 45 attached to bail 34 and wall 202 urges bail 34 in the clockwise direction (as viewed in FIG. 5). Bail 34 is held against the force of the spring by a pin 41, mounted on the bail, which is engaged by a latch arm 42 pivoted at 42a on wall 202. A rocker arm 43, mounted on a rock shaft 43a which is journalled in wall 202, engages a sloping surface 39a on arm 39, and also engages the under side of arm 42. The rock shaft is intermittently turned back and forth by means of a manual control operated by the student, as will be later explained.

The paper 40 passes over block 139 and between finger 37 and the cross portion of bail 34 then may fall down into the rear of the case, or may pass out through a slot 205 between plate 21b and the cover. Preferably the tape is threaded so as to fall into the case.

When arm 43 is in the position shown in full lines in FIG. 5, which is an intermediate position of its travel, it engages surface 39a and holds finger 37 out of contact with the paper. As arm 43 is moved clockwise, its left end rides up surface 39a, releasing arm 39 so that finger 37 engages the paper and presses it against bail 34 as shown in FIG. 5b, and also pushes latch 42 upward.

The parts are proportioned so that finger 37 engages the paper just before pin 41 is released from notch 42b. When the pin is released bail 34 snaps to the right under the action of spring 45, simultaneously retracting shield 33 from under window 32 and advancing the tape 40 one step so that the part previously under the open space 31 is now under window 32. The travel of bail 34 is limited by the extent of the openings 201b, 202b in walls 201 and 202. When the bail 34 moves to the right, arm 43 enters a notch 36a in the bail, and arm surface 39a is again engaged by arm 43 so that finger 37 is rotated clockwise to release the paper.

On the return stroke of arm 43, in the counter-clockwise direction, the left end of the arm travels down a sloping surface 36b at the base of notch 36a, pushing bail 34 back until pin 41 is again engaged in notch 42b. Arm 43 travels to the position shown by dotted line 43b in FIG. 5, holding arm 39 back to keep finger 37 out of engagement with the paper. When arm 43 again moves clockwise and reaches the position shown in FIG. 5, finger 37 again engages the paper.

As mask 25 is connected to bail 34 through arm 36 and finger 35, this mask is retracted and advanced along with mask 33 by the operation of arm 43 just described.

Figure 4B:
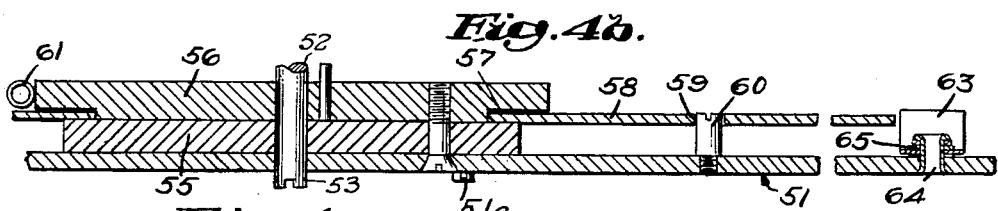
FIG. 4b is an enlarged fragmentary cross-section taken along line 4b—4b of Fig. 4.
Figure 4C:
FIG. 4c is a fragmentary view taken along line 4c—4c of Fig. 4.

The questions are printed on sectors of a removable disk 50 made of any stiff material such as paper board. This disk is supported on a turntable 51 mounted on a shaft 52 which is rotatably mounted in the housing. As shown in FIGS. 2, 3a, and 4b, shaft 52 has a pin 53 on its upper end to engage a hole in the center of the question disk. The turntable also carries an eccentric pin 51c which engages another hole in the question disk to locate the question disk correctly on the turntable. Turntable 51 is screwed to a spacer collar 55 and a shouldered block 56 which form between them a circumferential groove 57 in which the inner margin of a ring-shaped plate 58 is slidably received. A pin 60, fixed to turntable 51, engages a slot 59 in plate 58 to limit relative movement between the disk and the plate. As shown in FIG. 4, a coil spring 61 connected to block 56 and plate 58 normally retains the two in the relative position there shown. The outer rim of plate 58 is formed like a ratchet with teeth 62. A number of detents 63 are mounted on the under side of turntable 51. These detents can be swung in and out between the teeth when the disk 51 and plate 58 are in the position shown in FIG. 4. It is apparent that relative movement of disk 51 and plate 58 will serve to push all the detents 63 outward. As shown in FIG. 4b, each detent 63 is pivoted on a rivet 64 and engaged by a friction washer 65 which tends to hold the detent in any position in which it is placed. One of the detents, however, which is referred to as the "home detent" 66, is freely pivoted and is normally pressed outward against a pin 68 by a spring 67.

The turntable assembly is continually urged in the clockwise direction, as viewed from the top, by means of a clock spring, and the detents are successively engaged by a stop lug 70a mounted on arm 70, as best illustrated in FIGS. 7 and 7a. Arm 70 is pivoted on a pin 71 mounted on an arm 72 which is, in turn, pivoted on a pin 72a mounted on a bracket 207a which is, in turn, swivelled for horizontal rotation on a bracket 207 secured to the housing. The travel of arm 70 with respect to arm 72 is limited by pins 73 and 74. Arm 72 is normally held up so as to maintain lug 70a in the path of the detents by a spring 75. Arm 70 preferably carries a pair of counterweights 76a and 76b (FIG. 3), one at each end, which serve to damp the movement of the turntable as it comes to rest in a new position. The arm 70 is balanced so that lug 70a tends to assume the left position as seen in FIG. 7 when free.

A link plate 78 is pivoted on a pin 79 mounted on a bracket 80 which is attached to a plate 84 mounted in a recessed position in the front wall of the case. Plate 78 carries a pin 77 which engages a cam surface 72b on arm 72. The link plate also carries a pair of pins 82 and 82a which engage the upper and under sides of a handle lever 81 which projects through an L-shaped slot 83 in a recessed plate 84, mounted in the front wall 20a of the case and has a hand knob 81a mounted on its outer end. Lever 81 is attached to a collar 100 swivelled on a pin 106 which passes through an arm 107 attached to shaft 43a. This shaft is journalled on supporting brackets 207 and 208 mounted in the case.

When lever 81 is at its bottom position in slot 83, lug 70a is in the path of the turntable detents 63, as shown in FIG. 7. As lever 81 is raised, plate 78 is turned clockwise and pin 77 travels up cam surface 72b, carrying arm 70 down so that the stop lug drops below the detents as shown by the dotted line 70b in FIG. 7a. The motion of lever 81 also controls a brake mechanism on the turntable. A brake lever 101 is pivoted on a pin 102 for movement back and forth radially with respect to the turntable and is urged toward the table by a tension spring 104. The brake lever carries a shoe 103 which engages the edge of the turntable 51. When lever 81 is at its bottom position, the end of arm 107 engages a cam 105 on lever 101 and holds the brake out of engagement with the turntable. As lever 81 leaves its bottom position, shoe 103 is brought into engagement with the turntable. As lever 81 is again moved downward, lug 70a, which is directly under the detent with which it was previously engaged, is pushed to the left as it moves up, and arrives at a position to catch the next detent to the left. At the end of the down stroke of lever 81 the brake is released and table 51 moves until the next detent is engaged and stopped by lug 70a. In its released position, the upper end of lever 101 can be engaged by a spring catch 109 which is operated by depressing a push button 108. When this is done and handle 81 is raised, the table will run free as long as the button is held down, or until the table reaches the "home" position.

Up and down movement of lever 81, in addition to controlling the table motion, controls the movement of mask 25 and shield 33 and the paper advance mechanism. As shown in FIG. 8, shaft 43a extends all the way across the housing and is supported by bearing brackets 207 and 208. Rocker arm 43 which controls the paper advance mechanism and the two masks 33 and 25, as previously described, is secured to the right-hand end of this shaft. The upstroke lever 81 will rock arm 43 to retract the two masks 33 and advance the paper, and on the downstroke arm 43 will be rocked to return the masks to covering position.

Figure 9:
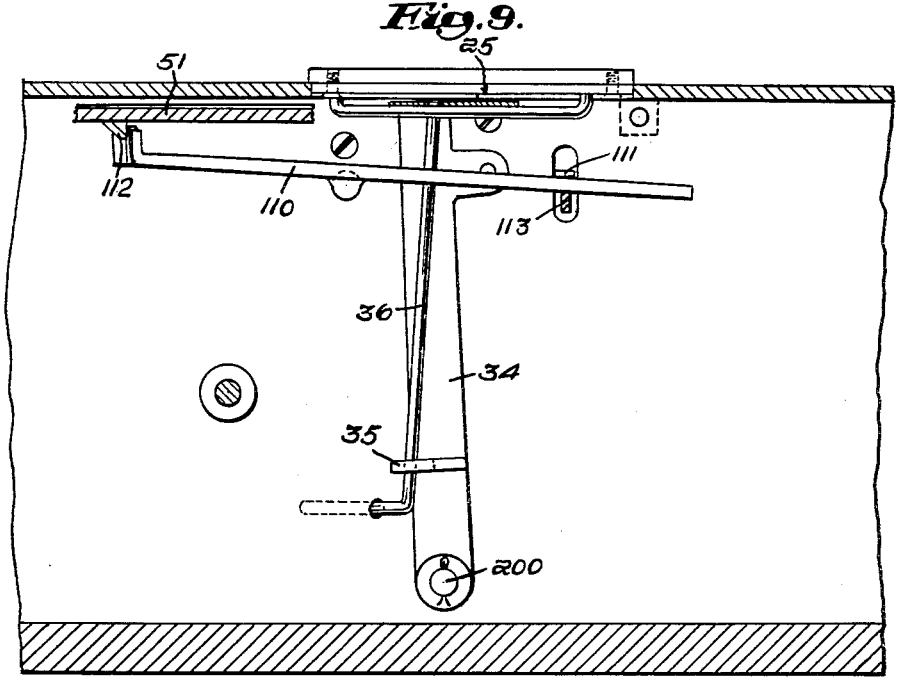
FIG. 9 is an enlarged fragmentary cross-section along line 9—9 of FIG. 8.

To stop the turntable in the "home" or starting position, a lug 112 is mounted on the under side of table 51 and is engaged by one end of an arm 110 when the table is in "home" position as seen in FIGS. 2, 8 and 9. This arm is mounted on a shaft 111, journalled on wall 201, and is engaged at its other end by a lever 113 pivoted at 113a on mounting bracket 210, as best seen in FIG. 8. This lever has a sloping surface 113b which is engaged by lever 81 when the latter moves back and forth in the horizontal leg 83a of slot 83. "Home" detent 66 also will stop the table in the start position when lever 81 is down.

The detents 63 are all set automatically in their outermost position whenever the cover 21 is opened. As shown in FIGS. 3a and 3b, a lug 114 is attached to the under side of plate 58. This lug is engageable by the upper end of an arm 120 which is mounted on a shaft 120a journalled in a bracket 120b on the bottom of the housing. Arm 120 is urged away from lug 114 by a spring 121. A plate 123 is connected to arm 120 and has a number of holes 123a, in any of which the hooked end 122a of a ball chain 122 may be engaged. These holes provide for adjustment of the effective length of chain 122. The chain passes around a pulley 124 mounted on the bottom of the case and has its other end secured at 125 to the cover 21. When the cover is raised, chain 122 and plate 123 pull arm 120 into engagement with lug 114 and turn plate 58 (clockwise as viewed from the top, counterclockwise as seen in FIG. 4) to the limit of slot 59, thus causing teeth 62 to push all the detents 63 outward. As will be later explained, the cover can be opened only when the turntable is in "home" position so that table 51 is held still by arm 110 during the resetting operation.

As best seen in FIGS. 3, 3a and 8, the turntable shaft 52 is driven by a clock spring 86 which is housed in a casing 87 having a cover plate 88. The cover plate is rotatable with respect to the casing and is attached to the shaft. One end of spring 86 is attached to the casing 87 and the other end is attached to cover 88. Casing 87 is attached to a ratchet wheel 89 rotatably mounted on suitable bearings in the bottom of casing 20. Wheel 89 is engaged by two pawls 90 and 91, pawl 90 being designed to push the wheel and pawl 91 to pull the wheel. These pawls are urged in their push and pull operative directions by tension springs 95 and 96, respectively. The pawls have pairs of rider lugs 93 and 94, respectively, which hold them in vertical alignment with wheel 89 and are urged against the wheel by a coupling spring 92.

A link 97 which rides freely on shaft 43a is connected to pawl 90, and a similar link 99 is connected to pawl 91. A link 98 which is attached to shaft 43a carries a pair of pins 100 and 100a which engage links 97 and 99, respectively. As shaft 43a is rocked (clockwise as viewed in FIG. 3a) by upward movement of lever 81, pin 100a pushes pawl 91 forward. Pawl 91 idles over the teeth of the ratchet on this stroke. Pawl 90, however, is allowed to move forward under the tension of spring 95 and turns the ratchet (clockwise as viewed in FIG. 3) in a direction to wind clock spring 86. On the down stroke of lever 81 pin 100 will pull pawl 90 back idling, and pawl 91 is released to pull on ratchet 89 under the tension of spring 96. The clock spring 86 is thus manually wound by operation of lever 81 and the machine thus requires no power source for operation. The clock spring cannot be over wound because it can be wound only to a tension equalling that of springs 95 and 96.

Masks 25 and 26 are automatically set to open position when cover 21 is raised. The movement of the cover is limited by a bar 21d which holds the cover in backward slanting position. Mask 25 will fall toward the back of the box under its own weight, and rod 29 carries a weight 29a which holds mask 26 in open position.

When lever 81 is moved back and forth in the horizontal leg 83a of slot 83, several operations are performed. When the table is in home position, movement of this lever to the right turns lever 113 so as to release lever 110 from lug 112. One of the detents referred to as the "home" detent 66, when the table is in home position, is normally turned in so that the table is held only by lug 112. Upon release of lever 110 the disk is free to move until the next detent engages lug 70a.

Lever 81, when moving up and down, rides in a notch 130a in plate 130 which is pivoted at 131 to swing right and left, as seen in FIG. 8. As lever 81 rides up in the notch, it engages a flexible leaf spring arm 132 which is bent to extend out to the left of the turntable and is anchored at 132a on plate 130. When lever 81 is moved to the right in horizontal leg 83a of slot 83, spring arm 132 is bent to the right and carries a lug 133 on its upper end into engagement with the nearest detent 63, pushing the detent half way in. In this position the detent will still be engaged by stop lug 70a when a selector lever 186, to be later described, is in position "2" (FIG. 6). When a detent has already been pulled half way in, if lever 81 is pushed to the right, a second lug 134 on spring arm 132 will engage the detent and push it all the way in. That particular detent will then be out of the path of lug 70a in position "2."

The arrangement just described results in the table stopping at least twice at each question position when selector lever 186 is in position "2," as lever 81 must be pushed sidewise twice at any one of the table positions in order to move the corresponding detent into its innermost position. Provision is made on the machine, however, for altering its operation so that a single sidewise movement of lever 81 will suffice to render a detent inactive. This is done by means of a selector mechanism which is best shown in FIGS. 6 and 7. It will be seen that the front end of arm 72 rides in a slot 85 in a lever 186, which is journalled on a pin pin 128 and projects upward through an opening in the cover 21. The upper end of spring 75 is anchored on a pin 126 mounted on lever 186. A leaf spring 127 is mounted on bracket 80 and has two notches 127a and 127b in either of which pin 126 may be engaged. When pin 126 is in notch 127a, arm 72, along with arm 70, which is mounted on it, is in such a position that lug 70a will be engaged by a detent 63 which is either all the way or half way out. When lever 186 is moved so that pin 126 is engaged in notch 127b, arm 72 will be moved slightly away from the table (to the right as viewed in FIG. 6, or to the left as viewed in FIG. 8). Arm 70 will thus be carried to a position in which lug 70a is in the path of the detents only when they are in their extreme outward position. A single stroke of lever 81 to the right will then move a detent to inoperative position.

Another mechanism which is operated by moving lever 81 to the right in slot leg 83a is a device for marking the tape to indicate when the student has answered the question correctly. As the right end of lever 113 (Fig. 5a) moves upward it engages a leaf spring 131 mounted at 137 on the under side of the block 139 over which the paper tape passes. This spring carries a pin 138 which passes up through a hole in block 139. When lever 113 pushes the spring up, pin 138 punches a hole in the paper which lies between the block and window 32. This punching operation is performed when mask 33 is in retracted position and window 32 has a hole to accommodate the upper end of the pin.

As previously stated, the turntable has a starting or "home" position. A locking arrangement is provided so that the cover 21 can be raised only when the turntable is in the "home" position. As best seen in FIG. 6 and FIG. 2, a bracket 144, mounted on wall 201, carries an arm 146 which is pivoted at 143. Arm 146 carries a curved lug 145 which engages in a notch 51b in the turntable when the table is in "home" position. Pivoted on the under side of the cover is an arm 148 which has a handle 148a (FIG. 1) projecting through a slot 21c in the cover. Arm 148 has a tab 147 which engages in slot 145a when the cover is down, and also has a latch member 148b which may engage under a latch bar 150. By pushing handle 148a to the right, as viewed in FIG. 1 lug 145 is moved out of engagement with notch 51b, and latch member 148b is engaged under bar 150. The table is thus released for movement, and cover 21 is locked down. This operation also moves an arm 140, which is connected to arm 146 by a link 141 to the position shown in full line in FIG. 6. When handle 148a is moved to unlock the box, which can only be done when the "home" notch 51b is aligned with lug 145, arm 140 is moved into the position shown by the dotted line 140b in FIG. 6, in which position a notch 140a on arm 140 engages lever 81 and locks it down. It is apparent that lever 81 must be in the down position before the cover can be unlocked.

To prevent the lever 81 from being moved horizontally twice in slot leg 83a, a latch 153 is provided. This latch is pivoted on pin 152 on plate 84, and is held up, when lever 81 is in the down position, by an arm 154 which is frictionally pivoted at 155 on plate 84.

As lever 81 moves up, arm 154 stays in the position shown in FIG. 6 due to the friction of pivot 155. As lever 81 is moved sidewise in the slot to the position shown in FIG. 6b, arm 154 is rotated counterclockwise.

When the lever 81 is again moved back toward the vertical leg of slot 83, as shown in FIG. 6a, latch 153 falls down, locking leg 83a. Lever 81 must then be moved down in slot 83 to rotate arm 154 clockwise and return latch 153 to the position of FIG. 6.

A fork 151 is freely swingable on pin 152 on plate 84 and is also engaged by lever 81 as the latter moves up in slot 83. As the lever is moved, this fork overrides slot leg 83a in the upward direction and must fall back into alignment with the horizontal slot leg before lever 81 can be moved into that leg. This prevents too rapid a movement of lever 81 up and sidewise.

Operation

The machine is operated in the following manner:

A disk 50 bearing questions printed in sectors 50a is mounted on the turntable 51. The disk has a hole for receiving an aligning pin 51c on the turntable so that the proper sector will be aligned with window 23. It is assumed that the machine has been loaded with a roll of paper tape which has been started through the paper feed mechanism under opening 24.

After the question disk is in place, the cover 21 is closed and locked by pushing handle 148a to locking position. This locks the cover, releases lug 145 from the turntable notch 51b, and releases lever 81 from locking plate 140, as previously described. The sector which is exposed in window 21 at the home position ordinarily contains instructions to the student, for example to write his name on the part of the tape exposed in open part 31 of opening. After he does so, he raises lever 81. The first upstroke is ineffective, as far as table movement is concerned, because the table is held stationary by arm 110 and tab 112. This stroke causes the part of the tape on which the student has just written to move back under window 32, as previously explained and incidentally retracts mask 33. Mask 25 is already retracted at the start and does not move. However, the upper end of rod 36 moves into engagement with notch 25a of mask 25 and thereafter this mask will be retracted when lever 81 is raised and brought forward to cover part of window 23 when the lever is lowered.

In order to release the turntable for operation, the student must move lever 81 to the right and thus free arm 110 from tab 112. In doing so he causes pin 138 to punch a hole in the tape beside his name.

Arm 132 is ineffective on the first side stroke because the "home" detent, which is at that time aligned with the arm, is already in. The table is now held by brake 103.

The student moves lever 81 back to the left and down to its starting position. This releases brake 103, allowing the table to move to the next detent, exposing the first question sector, and also brings masks 25 and 33 into covering position. The question, here indicated by the letter Q, is exposed, as illustrated in FIG. 1a, but the answer, indicated by the letter A, which is printed so as to lie in the right-hand rear corner of the trapezoidal window 23, is covered by mask 25. The student works out his own answer and writes it on the exposed tape in open part 31 of opening 24. He then raises lever 81. This movement retracts masks 25 and 33 and draws the part of the tape carrying his written answer back under window 32. He compares his answer to the one shown on the disk. If his answer is correct, he moves lever 81 to the right, making a punch mark in the tape, and at the same time moving the particular detent which is aligned with arm 132 one step inward. If selector lever 186 is set to notch 127b so that lug 70a is out of the path of detents which have been moved in one step, as previously explained, the turntable will automatically skip this particular question on the next round. If lever 186 is set to notch 127a, the same question will again appear on the second cycle of the turntable, and the student must answer the question correctly and move lever 81 to the right once more to put the associated detent out of operation. The student cannot avoid answering the question twice by moving lever 81 to the right twice on the first round because of the latching arrangement provided by latch 153, as previously described.

The machine can be used for teaching, review, or testing in a variety of ways. For example, if the student is reviewing material on his own, he can decide to go through the questions until he has answered them all either once or twice, and set lever 186 accordingly. When he has successfully completed the assignment, the turntable will turn freely the full way around to home position, indicating that all the detents have been pushed into inoperative position.

This same procedure may be used as a test, in which the student is scored on the time or number of cycles he requires to answer all the questions correctly, either once or twice. The length of the tape which he has used will indicate the number of cycles he required. This is indicated conveniently by the blank spaces corresponding to the home positions which will be skipped each time as there is no question in this space.

Another way to use the machine for testing is to require the student simply to go around the disk once, and determine the number of his correct answers by counting the punch marks on his tape record. The printed disk may carry a spiral line 50b to aid the student if he is working against time. The position of this line with respect to scale 27 indicates how far the disk has turned, and the student may skip a question which he does not know by depressing lever 81, and proceed to other questions if he feels that he is moving too slowly for an allotted time.

Another variation in the operation of the machine, either for review or for examination, is provided by mask 26. The disk may have "hints," or material which will aid the student in solving the problem, printed to appear in the left-hand corner of window 23. This material is exposed on the first cycle of the table. As the table again reaches home position, however, a sloping surface 26a of this mask is engaged by pin 51c and the mask is pushed into position to cover the left-hand side of window 23. On subsequent cycles the "hints" will be covered.

The machine has a number of safeguards to prevent the student from cheating in various ways. He cannot open the cover except when the table is in home position. Therefore, he cannot look at the disk to see the answer of a particular question before writing in his answer. The table can be turned to home position, to open the cover, by depressing button 108 and thus releasing the brake. If the student uses "skip" button to complete the cycle and position table so that box can be opened and then "skips" to the last question answered, a blank space will appear on the record because he has to raise lever 81 and move it sidewise to release the table.

The written answer is covered by the window 32 and cannot be changed when the answer on the disk is exposed. The knurled inserts 139a on block 139 will produce a characteristic pattern in the written answer which the student could not duplicate if he were to erase and correct an answer after taking the tape out of the machine. If he punches the tape to mark an answer correct when it is, in fact, incorrect, this can be easily checked by comparing his tape record with the correct answer.

One of the ways in which the student might try to produce a false record of the machine is to skip the space in which he is supposed to write his name or other identification at the start of the test, and write his name in the next space when the first question is presented. By moving handle 81 up he could then retract shield 25 and expose the correct answer to the question, then copy the answer into the next space which is now exposed in opening 31. By proceeding in this manner during the whole test, he would be simply copying answers from the disk. As previously explained, however, he must move lever 81 sideways at the beginning of operations in order to free the turntable. When he does this he punches a mark in the paper tape. If he has written his name in the space below that in which it should properly appear, this mark will be one space ahead of his name on the tape instead of beside his name and will thus give an indication as to what he has done. On the other hand, if he writes his name in the proper place, moves lever 81 up and sideways to start operations, and then moves lever 81 down to expose the first question and up to reveal the answer before he writes his own answer on the tape, he will have moved the tape back an extra space and there will be a space between his name and the first answer. The same thing will occur if he attempts to start copying answers instead of writing them in before mask 25 is retracted at any time during the test, because the paper will be moved an extra space between successive answers, thus leaving a blank.

This machine is useful for the student himself in reviewing material as it requires him first to compose an answer and then compare it to a correct answer. He is thus constantly reminded of the answers to questions with which he is not familiar until he finally remembers the correct answer. Questions which he answers correctly will automatically be skipped and those which he answers incorrectly will be constantly repeated until he finally remembers the correct answer. This repetition shortens the time required for review as he only repeats the questions with which he is unfamiliar.

As a testing device, the machine is very useful as the tape record adapts itself to mechanical scoring. Also, a large number of students can be supervised by one individual because of the tamper-proof nature of the machines.

The question disks can be used repeatedly and are thus much less expensive than question and answer papers or work sheets of the type which a student fills in. The expendible tape on which the student writes his answers is very inexpensive. A large variety of types of material may, of course, be printed on the disks, including complicated problems which the student might have to work out on scratch paper before inserting his answer. The fact that the student has to compose an answer permits a considerably wider range of types of material to be handled by this machine than is possible in a machine adapted for the multiple choice type of question.

What is claimed is:

1. A teaching device comprising a case having a first opening and a second opening, a turntable mounted in said case below said first opening, a disk mounted on said turntable and having sectors in each of which a question and a correct answer therefor are displayed, means for rotating said disk, means for controlling rotation of said disk in step by step progression to expose said sectors one at a time in said first opening, a first mask movable back and forth between a first and a second position and disposed between said turntable and said first opening so as to cover and uncover the part of said first opening in which the answer to the question exposed therein appears, a movable strip of sheet material mounted in said case below said second opening, means for driving said strip in step by step progression to expose successive portions thereof in said second opening, a transparent shield partly closing said second opening leaving a portion of said strip exposed for receiving a written record of an answer composed by the user of the device, a second mask movable between a first and a second position and to cover and uncover the portion of said second opening which is covered by said shield, and manually operated control means movable back and forth between a first and a second limit of travel, said control means being mechanically connected to said means for controlling the rotation of said disk, to the first movable mask, to the means for driving said strip of sheet material and to the second movable mask, whereby movement of said control means from one limit of its path of travel to the other simultaneously (a) moves said first mask from its first position to its second position to uncover the answer to the question then in said first opening, (b) advances the strip of sheet material to move the exposed portion thereof to beneath the transparent shield and (c) moves said second mask from its first position to its second position to uncover the portion of said second opening which is closed by said transparent shield and whereby movement of said control means back to its original position simultaneously (a) actuates the means for controlling rotation of the disk to move the next question and answer in the series into view in said first opening, (b) moves said first mask back to its first position to cover the part of said first opening in which the answer to the question exposed therein appears and (c) moves said second mask back to its first position to cover the portion of said opening which is closed by said transparent shield.

2. A device as described in claim 1, said turntable driving means including a spring urging said table in a given direction, a number of movable detents mounted on said table, said detents being movable radially from a first position to a second position so as to follow a first circular path when in their first position and so as to follow a second circular path when in their second position; a latch member movable in and out of the first circular path of said detents, and detent moving means connected to and operated by said control means for moving a selected detent from its first position to its second position to follow said second circular path.

3. A device as described in claim 1, each sector having a portion on which supplemental information is displayed and the device having a third mask movable to cover and uncover the portion of said first opening in which said supplemental information appears.

4. A teaching device comprising enclosure means having a first opening and a second opening, question and answer display means disposed below said first opening for displaying one of a series of questions each accompanied by a correct answer successively in said first opening, only one question and the answer thereto appearing at one time in said first opening, drive means connected to said question and answer display means, mask means movable back and forth between a first position and a second position for alternately masking and exposing to view the answer to the question then appearing in the first opening, a transparent shield partially closing the second opening, a strip of sheet material mounted in said enclosure in position to expose a portion of said material in said second opening adjacent said transparent shield, means for progressively advancing said strip of sheet material to expose successive portions thereof in said second opening and to permit the user of the device to record thereon an answer to the question then displayed in said first opening, and manually operated control means movable back and forth between a first and a second limit of travel, said control means being connected to said drive means for the question and answer display means, to said movable mask means and to said means for advancing the strip of sheet material, whereby movement of said control means from one limit of its path of travel to the other simultaneously moves the movable mask means from its first position to its second position so as to unmask the answer to the question then appearing in the first opening and actuates the means for advancing said strip of sheet material to move the exposed portion thereof to beneath the transparent shield in the second opening and whereby movement of the control means back to its original position simultaneously actuates the drive means for the question and answer display means so as to place the next question and answer in the first opening and moves the movable mask means back to its first position to mask the answer to said next question.

References Cited in the file of this patent

UNITED STATES PATENTS

| | | |
|---|---|---|
| 1,929,872 | Lavery | Oct. 10, 1933 |
| 2,311,055 | Kopas | Feb. 16, 1943 |
| 2,401,434 | Mills | June 4, 1946 |
| 2,496,767 | Zuercher | Feb. 7, 1950 |
| 2,687,579 | Davis | Aug. 31, 1954 |
| 2,690,621 | Dean | Oct. 5, 1954 |
| 2,805,494 | Hankes | Sept. 10, 1957 |

UNITED STATES PATENT OFFICE
CERTIFICATE OF CORRECTION

June 13, 1961

Patent No. 2,987,828

Burrhus F. Skinner

It is hereby certified that error appears in the above numbered patent requiring correction and that the said Letters Patent should read as corrected below.

Column 2, line 6, for "specific" read -- specified --; line 21, for "frammentary" read -- fragmentary --; line 45, for "aolng" read -- along --; column 10, line 71, after "and", first occurrence, insert -- disposed between said strip of sheet material and said second opening so as --.

Signed and sealed this 31st day of October 1961.

(SEAL)
Attest:

ERNEST W. SWIDER
Attesting Officer

DAVID L. LADD
Commissioner of Patents